Sept. 14, 1965  R. E. STEGLER  3,205,691
METHOD OF AND APPARATUS FOR FABRICATING HOLLOW ARTICLES
Filed Dec. 15, 1959  2 Sheets-Sheet 2

INVENTOR.
RICHARD E. STEGLER
BY John J. Sullivan
ATTORNEY.

United States Patent Office 3,205,691
Patented Sept. 14, 1965

3,205,691
METHOD OF AND APPARATUS FOR
FABRICATING HOLLOW ARTICLES
Richard E. Stegler, Huntington, N.Y., assignor to Republic Aviation Corporation, Farmingdale, N.Y., a corporation of Delaware
Filed Dec. 15, 1959, Ser. No. 859,796
15 Claims. (Cl. 72—364)

This invention relates to the fabrication of hollow articles and more particularly to a method of and means for working and forming hollow articles.

In many instances, hollow articles such as cylinders, tubes, etc., are required to have the greatest possible tensile strength. Where relatively close tolerances (i.e., ±0.005" transverse dimensions) are also required, manufacturing problems arise.

For example, in the fabrication of hollow metal articles to such dimensions, in order to obtain the desired strength characteristics, heat treating, including tempering, is often necessary, and this almost invariably results in dimensional irregularities in the end article due to warpage, distortion, and the like. This is especially true of such articles having overall length and transverse dimensions that are large in proportion to wall thickness.

In addition, if maximum strength is to be obtained in the end article, internal stresses set up and locked in the material of the article during heat treating must be properly oriented to prevent deformation of the article, particularly during the tempering operation.

The present invention is directed to a solution of the above and other problems in the working and forming of such articles. To these ends, a method and means is proposed whereby the article may be fabricated to selected dimensions within relatively close tolerances, and whereby the internal stress pattern of the article is such that deformation thereof due to warpage, distortion, etc., is minimized, if not totally eliminated.

In general, the instant invention contemplates the initial fabrication of a hollow preform or workpiece of selected length, inner diameter and wall thickness. The length of the preform may be slightly greater than that required in the ultimate article to the end that trimming and finishing operations may be performed thereon, if desired. The inner diameter of the workpiece is somewhat less than that desired in the end article, i.e., the preform is "undersized" in its transverse dimension, whereby it may be formed to a selected diameter as contemplated herein. Since working and forming of the workpiece as proposed herein is such that the wall thickness of the preform is relatively unaffected, or any change therein may be controlled, the wall thickness of the preform is substantially the same as that desired in the end article.

In accordance with the present method, a preform fabricated as above set forth is heat treated by uniformly heating it to a predetermined temperature which is maintained for a selected time interval depending upon the characteristics of the particular material from which it is made and those required in the end article. While thus heated, the preform is then concurrently formed and quenched to its final configuration and size to thereby produce the end article. If desired, the article is thereafter reheated to the temperature or temperatures required to temper or age the material thereof.

The present apparatus is constructed and arranged to selectively and automatically perform the above operations or steps in the working and forming of the preform or workpiece. Moreover, the instant apparatus may also be used for conventional expansion or bulge forming of workpieces where concurrent forming and quenching may not be necessary or desired.

Broadly, the apparatus contemplated herein comprises means for heating a preform of the article to heat treat the same, and means for forming the heated preform to its final size and configuration. In addition, the heating means, as well as the forming means, are constructed and arranged whereby either or both may be utilized to cool or quench the preform either sequentially to or concurrently with the forming thereof to the end that it is quenched and sized to final configuration or form. The heating means, in addition to having utility in heat treating the preform, may also be used subsequent to the forming thereof to temper or stress-relieve the material of the formed article.

The apparatus proposed herein also embodies control means whereby the heat treating, forming, quenching, and tempering operations may be accomplished automatically in any selected or predetermined order and timing sequence.

With the above and other objects in view, as will be apparent, this invention consists in the steps or method of and apparatus for working and forming hollow articles and in the construction, combination and arrangement of parts all as hereinafter more fully described, claimed and illustrated in the accompanying drawings wherein:

FIG. 2 is a section taken along line 2—2 of FIG. 1;

FIG. 3 is a fragmentary view of the outer jacket associated with the forming means; and, FIG. 4 is a section taken along line 4—4 of FIG. 2 to show the engagement means between the die of the forming means and the base or bed of the apparatus.

Figure 1:
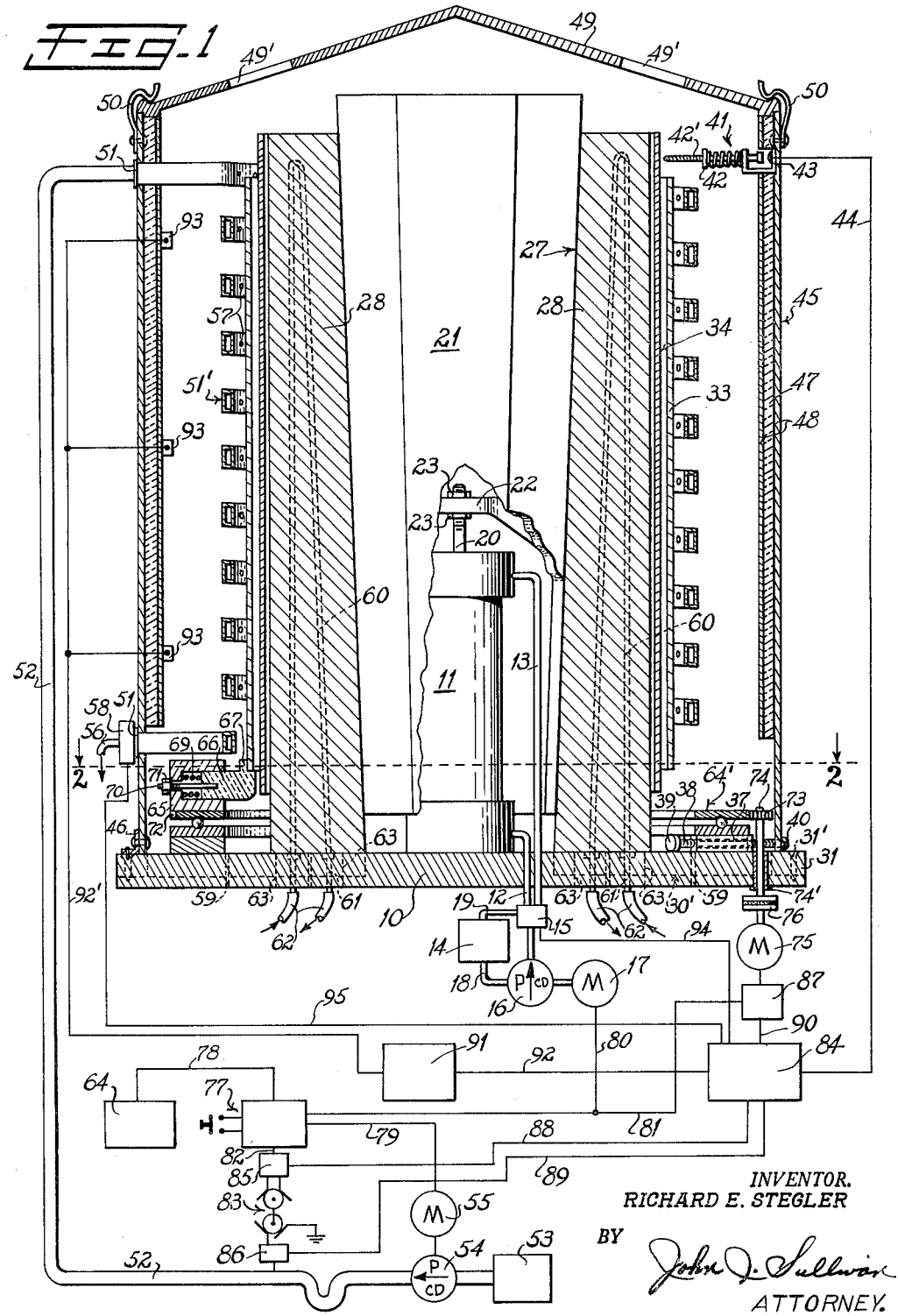
FIG. 1 is a vertical section through the apparatus contemplated herein together with a wiring diagram of the associated control mechanism whereby the several forming and working operations are accomplished in a selected order and sequence.

Referring more specifically to the drawings, 10 designates a supporting structure or bed of the working and forming apparatus proposed herein. Fixedly mounted on the bed 10 is a power-actuating device such as, for example, a double-acting hydraulic actuator or cylinder 11 having fluid lines 12 and 13 connected thereto. The fluid lines 12 and 13 communicate at one of their ends with the interior of the cylinder 11, one to each side of a piston head operating therein in the conventional manner. The opposite ends of the fluid lines 12 and 13 are connected to a fluid reservoir 14. Operatively connected in the lines 12 and 13 between the cylinder 11 and the reservoir 14 is a control or selector valve 15 and a pressure pump 16 driven by an electric motor 17. The reservoir 14 is connected to the pump 16 by a delivery line 18 whereby fluid passes from the reservoir to the inlet of the pump where it is pressurized and delivered to the valve 15 for delivery to one or the other of the fluid lines 12 or 13 or back to the reservoir through a return line 19 connecting the valve 15 to the fluid reservoir 14.

The operation of the valve 15 is such that when one of the lines 12 or 13 is operatively connected to the fluid pressure pump 16, the remaining line communicates with the return line 19 whereby the fluid exhausted by the cylinder 11 is returned to the reservoir. When neither of the lines 12 or 13 is operatively connected to the pump 16, the valve 15 passes the pressurized fluid to the return line 19 whereby fluid from the reservoir 14 merely circulates through the pump 16, valve 15, and back to the reservoir 14.

A connecting rod 20 projects from the end of the cylinder 11 in opposition to the bed 10. Adjacent its outer end the rod 20 is fixedly connected to a ram 21.

For this purpose, the ram 21 is hollow adjacent its lower end and structurally reinforced by a transverse web 22. The web 22 is centrally pierced by an opening for the passage of the end of the connecting rod 20 which is fixedly connected thereto by suitable means such as, for example, a pair of opposed nuts 23 acting on opposite faces of the web 22. Thus, the ram 21 is concentrically disposed over and around the cylinder 11 for reciprocation by the piston rod 20 relative to the bed 10. At its outer end the ram 21 is somewhat larger than at its inner end whereby it has an inverted taper. The outer surface of the ram 21 is multi-faced or paneled to thereby form, for example, a hexagonal section.

Mounted on the bed 10 around the ram 21 is an expendable mandrel or split die 27. This die 27 comprises a plurality of sections or segments 28, each disposed with its sides adjacent the sides of the next sections to define a substantially continuous member around the ram 21. Each section 28 is thicker adjacent its lower end, the inner surface being sloped to conform to one of the faces of the ram 21 whereby the outer surface of each section 28 is disposed in a vertical plane relative to the bed 10 when the sections and ram abut. Thus, the several sections 28 cooperate one with the other to form a substantially continuous inner surface for abutting coaction with the entire surface of the ram 21.

In order to guide and control the movement of the sections 28 radially of the bed 10 upon extension and retraction of the cylinder 11, a dovetail arrangement (FIG. 4) is provided between each section and the bed 10. To this end, the lower end of each section 28 is formed or otherwise provided with a tenon 30 to be received in a complementary mortise 30' in the upper surface of the bed 10. At its outer end each mortise 30' is closed by a removable plug 31 fixedly secured thereto, as by a screw 31'. A spring 32 is located in each mortise 30' between the outer face of the associated tenon 30 and the adjacent face of the plug 31 to act on and against each section 28 in opposition to its outward movement. The several springs 32 thereby resist expansion of the die 27 and collapse it upon the extension of the cylinder 11.

It is now apparent that when the cylinder 11 is extended to dispose the ram 21 outwardly of the bed 10 the die 27 contracts under the action of the several springs 32 in their respective mortises or dovetail slots 30' on and against the associated section 28. As the cylinder 11 is retracted to move the ram 21 toward the bed 10, the outer faces of the ram abut and slide along the respective associated sloping surfaces of the sections 28 of the die 27, forcing the sections outward of the bed 10 against the action of the several springs 32. The die 27 is thereby expanded until such time as the ram 21 abuts the bed 10 or is otherwise limited in its travel.

The article to be fabricated is illustrated herein as a cylinder 33 initially preformed to undersized transverse dimensions, i.e., inner diameter. With the die 27 in its collapsed position (cylinder 11 extended), the preformed cylinder 33 is disposed around it. Thereafter, upon expansion of the die 27 by operation of the motor 17 to retract the cylinder 11, the preformed cylinder is expanded or formed to its ultimate size. In this forming operation, the outer surfaces of the several sections 28 combine to establish a contour by which the end article is shaped.

Where relatively few sections 28 are employed in the die 27 and a smooth and uninterrupted inner surface is required of the article, a substantially unbroken forming surface on the die 27 may be obtained by means of a flexible outer sheet or jacket 34. The jacket 34, when used, is formed by multiple segments, each comprising a resilient strip 34' of spring material fixedly secured medially of its width to a section 28 of the die 27 with its free edges extending beyond the adjacent edges of the underlying section 28. The free edges of each strip 34' engage or interlock with the free edges of the next adjacent strips 34'.

Each strip or spring 34' is bowed transversely to form an arc having a radius that is smaller than that of the die 27 in its collapsed position to permit the expansion thereof with the expansion of the die. The overlapping end portions of the springs 34' are formed with mating tongues 35 and grooves 35 (FIG. 3) to thereby be disposed in a common plane flush against the outer surface of the die 27 when expanded.

In order to control the expansion of the preform 33 to its ultimate size, mechanical means in the form of an adjustable stop is provided to physically limit outward movement of the expandable die 27 during the forming operation. This stop comprises one or more sleeves 37 fixedly mounted on the upper surface of the bed 10 and internally threaded for the passage therethrough of a bolt 38. At its inner end the bolt 38 terminates in a head 39 adapted to contact the die 27 during expansion and to arrest the further movement thereof. At its outer end the bolt 38 is provided with a nut 40 the adjustment of which locates the head 39 in a predetermined position. If desired, a comparable stop may be provided adjacent the other end or top of the die 27.

In addition to, or in lieu of, the mechanical means just described, electrical means in the form of a microswitch 41 may be provided to limit expansion of the die 27. The microswitch 41 comprises a spring-loaded plunger 42 mounted adjacent and projecting toward the die 27 under the influence of its spring. The length of the plunger 42 is adjustable as at 42' whereby the position of its outer end may be located to engage the outer surface of the die 27 during expansion. Thereafter, continued expansion of the die 27 compresses the plunger 42 for ultimate engagement of its opposite end with an associated contact 43 electrically connected to the valve 15 through a conductor 44 and operative when so engaged to actuate the valve 15 to its holding position, i.e., connecting the lines 18 and 19. As will become more apparent, this microswitch arrangement lends itself to integration into the circuitry of the control means by which the several operations to be performed by the apparauts are synchronized for automatic operation.

In addition to forming the preform 33 to its ultimate size and shape in the foregoing manner, the present apparatus includes means for heating the preform or workpiece to a selected temperature and for cooling or quenching it. In order to accomplish this, the ram 21 is enclosed within a casing or canister 45 having an open lower end which rests on and abuts the upper surface of the bead 10 and to which it is fixedly secured by conventional means, such as flanges 46. The casing 45 serves to support the heating and auxiliary quenching means as well as to protect the workpiece 33 against drafts, etc., which might result in uneven distribution of temperatures in the workpiece. The walls of the casing 45 are preferably fabricated of insulating material 47 such as, for example, asbestos, micarta, etc., sandwiched between walls 48 of suitable structural material.

At its outer end or top, the casing 45 is closed by a removable wall or cover 49 adapted to be secured thereto as, for example, by one or more spring clamps 50. The cover 49 is substantially conical in form so that its medial portion projects outwardly from the casing 45 to permit vertical movement of the ram 21 relative to the bed 10. The cover 49 is provided with a number of ports or openings 49' to thereby provide venting means for the escape of heat and/or pressure from the container 45 during the forming and working operations. If desired, or required, the ports 49' may be connected to a suitable exhaust system for the container 45. Such exhaust systems are well known to the art and, per se, form no part of the present invention.

An induction coil 51' is mounted within the casing 45 around the workpiece 33. The coil 51' comprises a tubular, helically-wound, continuous conduit of conductive material, e.g., copper or the like, surrounding the workpiece 33 and ram 21. The coil 51' is preferably rectangular in section, and is disposed at least partially beyond the opposed ends of the workpiece 33 to assure greater uniformity of heating thereof throughout.

At each opposed end, the coil 51' terminates in a fitting 51 which is adapted to be secured to the wall of the casing 45 in any well-known, conventional manner to provide inlet means to the coil from outside the casing 45. The upper fitting 51 is connected by a pipeline 52 to a suitable source or reservoir 53 of coolant, for example, water, oil, air, etc. A pump 54 driven by a motor 55 is operatively connected to the pipeline whereby the coolant is delivered from the reservoir 53 to and through the coil 51'. The lower fitting 51 is connected to the reservoir 53 or waste through a return line 56.

The coil 51' is preferably perforated throughout its length by a plurality of openings 57 in the wall thereof adjacent the die 27. These openings 57 are of such size and location that normal coolant flow results in substantially no coolant leakage therethrough. If desired, or to assure no leakage during normal coolant flow, these openings may be closed by pressure-actuated valves, i.e., flapper valves.

In addition to a normal coolant flow through the coil 51' for a reduction in temperature of the workpiece 33, the present invention also contemplates relatively rapid quenching means. More specifically, a normally open solenoid check valve 58 is connected in the return pipeline 56 and operative when closed to pressurize the coolant in the coil 51' and pipeline 52 forcing it to be ejected or sprayed through the opening 57 on and against the workpiece 33. Suitable drains 59 may be provided in and through the bed 10 to remove the auxiliary quenching coolant from the interior of the casing 45, each such drain being connected at its opposite end through conventional conduits or piping to waste or to the source 53.

In order to supplement or, in some cases, deter this cooling operation, each of the segments 28 of the die 27 is further provided with an internal duct 60 connected at one of its ends to an appropriate heating source or to a coolant source the equivalent of source 53 and at its opposite end to waste or to the source. A fluid flow through the ducts 60 will thus heat or cool the die 27 accordingly. More specifically, a fitting 61 is connected to each end of the duct 60, being secured to and projecting from the associated segment 28 at its outer end. Each fitting 61 is adapted to connect to suitable conduit means, such as a flexible hose 62, the hose from one such fitting 61 extending to the source and the hose from the other fitting extending to the return. A radial slot 63 is provided in the bed 10 for the passage therethrough of each fitting 61, the length of such slots corresponding to the range of expansion of the die 27 in the forming operation of the workpiece or preform 33.

The pipeline 52 may further serve as an electrical conductor, in such case being of conductive material and connectable to a suitable power source 64. When operatively connected, an electric current is transmitted through the pipeline to the coil 51' to inductively heat the entire length of the cylinder 33 whereby the temperature thereof is raised to the desired level to effect the heat treat operation.

In order to further insure uniformity of heating of the workpiece 33, a slewing ring is provided within the casing 45 to mount and support the workpiece 33 and rotate it relative to the coil 51.' The slewing ring is mounted on the upper surface of the sleeves 37 and comprises and annular ball bearing 64' with its lower half or race fixedly secured to each sleeve 37 to be stationary on the bed 10. The movable upper half or race is formed or otherwise provided with a number of cup-like bosses 65 at several spaced locations on its upper surface opening toward the die 27.

A pin is mounted for reciprocation in each cup 65 and projects outwardly therefrom, terminating in a workpiece supporting end defined inwardly by an upstanding stud 67. Seated witin each cup 65 is a compression spring 69 the opposite ends of which act on the base of the cup and the adjacent end of the pin 66, constantly tending to move the pin outwardly of the cup 65. At its inner end the pin 66 terminates in a bolt 70 which projects centrally therefrom, passing through an opening in the base of the cup 65 provided therefor. A nut 71 is threadably mounted on the outer end of the bolt 70 and acts on and against the outer surface of the cup 65 in opposition to the spring 69 whereby outward movement of the pin 66 under the influence of the spring is limited and the location of the stud 67 may be adjusted.

The workpiece 33 is disposed within the casing 45 around the die 27 with its lower end disposed on the end portions of the several pins 66 and its outer surface abuting the adjacent surface of the studs 67, the position of the pins 66 having been appropriately located for this purpose by adjustment of their respective nuts 71. In order to electrically and thermally insulate the workpiece 33 the pins 66, including their upstanding studs 67, are fabricated of a non-conductive, heat resistant material, such as micarta, asbestos, etc.

The outer periheral edge of the upper movable race of the bearing 64' is formed with a series of teeth 72 to thereby constitute a gear wheel. A pinion gear 73 is tangentially disposed relative to, and meshes with, the teeth 72 of the gear wheel, being connected to the outer end of a drive shaft 74 mounted in a bearing 74' carried by and passing through bed 10. At its other end the shaft 74 is connected to and driven by a motor 75. A flexible coupling 76 may be incorporated in the shaft 74 to facilitate meshing engagement between the pinion 73 and teeth 72 during the rotation thereof by operation of the motor 75. The workpiece 33 is thereby rotated relative to the coil 51' whereby it is uniformly heated throughout.

In order to sequentially integrate the several foregoing operations, i.e., heating, forming and quenching of the workpiece 33, the individual components of the apparatus as described are operatively interconnected through electrical circuitry, including automatic control devices, each of which, per se, is well-known to the art. Such circuitry comprises a master control switch 77 with an input feed line 78 from the power source 64. At its output side the switch 77 is individually connected to the motors 55, 17 and 75 through respective conductors 79, 80 and 81. Thus, when the switch 77 is closed, current is simultaneously delivered from the power source 64 to each of the motors 55, 17 and 75 for the operation thereof. The switch 77 is also connected through an output lead 82 to a motor generator 83 electrically connected to the conductive pipeline 52.

By means of and through a bank 84 of variable time delay relays, an infinite variety of sequences in the operation of the forming die 27, the coolant flow, quenching, and the induction heating circuit may be effected as required, depending upon the characteristics of any particular workpiece as determined by the material, size and shape thereof and the requirements of the ultimate article. The several relays in the bank 84 are adapted to be connected through respective conductors 88, 89 and 90 to normally closed magnetic circuit breakers 85, 86 and 87 associated respectively with the control switch 77, motor generator 83, and motor 75, whereby the operation of each is discontinued in accordance with the presetting of its associated relay in the bank 84. The lead 44 from microswitch 41 is also connected to a relay in the bank 84, said relay being actuated by closing the microswitch 41 effected upon contact of the die 27 in expanding with the plunger 42 thereof.

In order to control and limit the degree of heating of the workpiece 33 during the heat treat operation, an electronic pyrometric control 91 is also connected through a conductor 92 to a relay or relays in the bank 84. At its other side the control 91 is connected through a conductor 92' to a plurality of sensing elements 93 attached to, and covering localized areas of, the inner surface of the wall of casing 45.

Such a control as the electronic pyrometer 91 is well known to the art and includes an adjustable electrical impulse means adapted to receive signals from the sensing elements 93 corresponding to temperature levels within the casing 45. When the temperature in the casing 45 reaches the adjusted or preestablished level set into the control 91, an output signal therefrom automatically activates the associated relay in the bank 84 to open circuit breaker 86 and discontinue operation of the generator 83 and concurrently initiate a timing relay in the bank 84 which has been set for a period in which it is desired to soak the workpiece 33 in the elevated, adjusted temperature. If during the soaking period the temperature within the casing 45 drops below the set level as measured by the sensing elements 93 and detected by the control 91 from the impulses received from the elements 93, the control 91 actuates a starting relay in the bank 84 by which the circuit breaker 86 is again closed and the coil 51' thereby reenergized. Thus, the workpiece 33 is heated to its heat treat temperature and maintained at such temperature for the prescribed period.

Upon completion of the soaking operation in the foregoing manner as determined by the setting of the timing relay within the bank 84, the timing relay operatively disengages the generator 83 through circuit breaker 86 and simultaneously initiates the next operation, e.g., the working and forming operation of the workpiece. Thus, with the several relays in the bank 84 initially set corresponding to the characteristics of the material, size, etc., of the workpiece 33 and the characteristics required of the end article, operation of the apparatus through its several cycles, including forming, cooling, quencing, etc., is automatic.

Taking a specific example, merely as representative of the entire operation of the present apparatus, in the fabrication of parts from low alloy carbon steel the bank 84 of relays is initially adjusted to give the following time sequence for automatic operation of the electrical circuitry and the heating, forming, cooling and quenching systems as hereinabove described. Upon closing the switch 77, the coil 51' is energized by the connection of the power source 64 through the closed circuit breakers 85 and 86 to supply induction heating currents to the coil 51'. Motor 55 is simultaneously actuated whereby the normal coolant flow is circulated from its source 53 through the pipeline 52, coil 51', and return pipeline 56. The slewing ring or bearing 64' also commences to rotate by this closing of the switch 77, and the motor 17 of the hydraulic system is actuated. Valve 15 in its normal position connects the line 18 to the return line 19 so that the cylinder 11 is inoperative at this time with the piston at the top of its stroke and the die 27 in its collapsed position.

When the temperature of the workpiece 33 within the casing 45 reaches the preset level required for austenitizing as detected by the sensors 93, a corresponding signal is transmitted thereby to and through the control 91 to the associated relay in the bank 84. The circuit breaker 86 is thereby opened, breaking the circuit between the motor generator 83 and the coil 51'. The temperature level of the workpiece 33 is maintained at the preset level by operation of the control 91 through the associated relay in the bank 84 as described for a predetermined period of time as measured by the timing relay in the bank 84.

Upon the elapse of such time, the heat treating or austenitizing cycle is completed and the quenching and forming cycle commences. More specifically, the timing relay actuates circuit breaker 86 to open and simultaneously actuates the valve 15 through a connecting conductor 94 to operatively connect line 18 to the line 13 and concurrently connect line 12 to line 19 for retraction of the connecting rod 20. The ram 21 is thereby caused to descend into the segmented die 27 for the expansion thereof. At the same time, i.e., when the workpiece 33 has thoroughly soaked in the elevated temperature within the casing 24, the timing relay in the bank 84 actuates magnetic circuit breaker 87 through the connecting conductor 90 to break the circuit between the power source 64 and the motor 75 to thereby stop rotation of the slewing ring 64'.

Concurrently with the forming operation, i.e., the expansion of the die 27 by retraction of the ram as described, contact of the die 27 against the workpiece 33 effects a cooling of the latter due to the relative temperatures of the workpiece and die. The maintenance of a continuous temperature differential between the workpiece 33 and the die 27 may be supplementally effected by the fluid flow through ducts 60 internally of the die segments 28. The control for such a fluid flow is not shown in the drawings, any conventional control means or valve arrangement being intended. So far as the instant invention is concerned, the fluid flow through the ducts 60 may be continuous throughout the entire operation of the apparatus.

In addition, the auxiliary quenching of the workpiece 33 may be effected for a more rapid reduction in temperature by presetting a relay in the bank 84 to actuate the normally open solenoid valve 58 through a connecting conductor 95 to close it and thereby block the flow of coolant from coil 51' into the return pipeline 56 concurrently with the forming operation. With the valve 58 closed, the coolant pressure within the coil 51' builds up until the coolant is ejected through the openings 57 onto the workpiece 33.

When the die 27 reaches a pre-established position in expansion corresponding to the ultimate size of the article being formed as determined by the adjustment of the stops 39 and microswitch 41, a signal is transmitted by microswitch 41 to its associated relay in bank 84 for actuation of the valve 15 through conductor 94, disconnecting the fluid source 14 from the line 13 and re-establishing a connection between lines 18 and 19 whereby the ram 21 becomes locked in a fixed position.

Subsequently, when the workpiece 33 has reached a stable temperature, i.e., room temperature, as sensed by the elements 93, a corresponding signal is transmitted therefrom to and through the control 91 to a relay in the bank 84 for actuation of the solenoid valve 58. The valve 58 is thereby opened whereby circulation of the coolant from the source 53 through pipeline 52, coil 51', and return line 56 resumes. Thereafter, the timing relay in bank 84 again actuates the valve 15 to connect line 18 to line 12 and concurrently connect line 13 to the return line 19 whereby the cylinder 11 is protracted for the collapse or contraction of the die 27 by the action of the springs 32. The entire working and forming cycle of the apparatus having been completed, the timing relay in bank 84 also actuates the circuit breaker 85, causing the master switch 77 to be opened whereby all operation of the apparatus ceases.

In some cases, with low alloy carbon steel, as well as other materials of the workpiece, it may be desirable to temper the workpiece 33 after it has been worked or formed. In such cases a tempering or stress relieving operation is possible without removing the workpiece 33 from the apparatus. An additional cycle in the operation is preset in the bank of relays 84 by appropriate setting of the timing relay therein whereby after completion of the working and forming operation as above the timing relay instead of activating the master control switch 77 as stated actuates the magnetic circuit breaker 86, i.e., closes it, thereby re-establishing a circuit between the motor generator 83 and the coil 51'. The temperature of the formed article is thereby raised to a pre-established value as sensed by the elements 93 and transmitted to and through the control 91, which actuates an associated timing relay in the bank 84 whereby upon the elapse of a predetermined period during which the article is maintained at a tempering or stress relief temperature the circuit just established is broken as before. The slewing ring 64' may or may not, as the case may require, be simultaneously activated as before by an appropriate setting of its relay in the bank 84 during this operation.

In view of the foregoing, it is apparent that by presetting the relays in the bank 84, as well as the control 91, any sequence of operation of the several components of the working and forming apparatus can be effected. Moreover, the operation of any two or more of these several components in heating, forming, cooling and quenching the workpiece into the ultimate article may be concurrent. Thus, the apparatus may be preset in accordance with the specific characteristics of the material of the workpiece and those desired or required of the end article.

At the same time, the apparatus performs each step in the present method, after an undersized preform of the end article has been initially produced. The temperature of the preform is thereby elevated to heat treat the material of which it is made and maintained at this elevated temperature for a prescribed time. Thereafter, the preform is concurrently expanded and cooled or cooled and quenched to its ultimate size and shape. Finally, the temperature of the article thus formed is reduced to a stable or room temperature.

In some cases, an additional step is contemplated, i.e., the temperature of the article is elevated to a prescribed degree to stress relieve it. This additional step, as well as the degree to which the temperature of the article is elevated, will depend on the particular material of the workpiece.

What is claimed is:

1. The method of fabricating a hollow metal article in situ from a preform of the article having undersized, transverse dimensions, consisting in uniformly heating the preform throughout to the heat treat temperature of the metal, cooling the preform at a predetermined rate, constantly monitoring said cooling, and expanding the preform uniformly at a rate coordinated with and corresponding to the rate of cooling to produce the ultimate article.

2. The method of fabricating a hollow metal article in situ from a preform of the article having undersized, transverse dimensions, consisting in concurrently varying the temperature of said preform at a predetermined rate, monitoring said temperature variation, and uniformly expanding the preform at a rate corresponding to said temperature variation to produce the ultimate article.

3. The method of fabricating a hollow metal article in situ from a preform of the article having undersized, transverse dimensions, consisting in uniformly heating the preform throughout to the heat treat temperature of the metal, holding the preform at that temperature for a predetermined length of time, cooling the preform at a predetermined rate, monitoring said cooling, and expanding the preform uniformly at a varying rate coordinated with and corresponding to the rate of cooling to produce the ultimate article.

4. The method of fabricating a hollow metal article in situ from a preform of the article having undersized, transverse dimensions, consisting in uniformly heating the preform throughout to the heat treat temperature of the metal, holding the preform at that temperature for a predetermined length of time, cooling the preform at a predetermined rate, monitoring said cooling, expanding the preform uniformly at a varying rate coordinated with and corresponding to the rate of cooling, uniformly reheating the expanded preform to its tempering temperature, and holding the expanded preform at that temperature for a predetermined length of time to produce the ultimate article.

5. The method of fabricating a hollow metal article in situ consisting in uniformly heating a preform of the article throughout to a predetermined temperature as determined by the characteristics of the particular metal, holding the preform at that temperature for a predetermined length of time, cooling the preform at a predetermined rate, and expanding the preform uniformly at a varying rate coordinated with and corresponding to the rate of cooling to produce the ultimate article.

6. A working and forming apparatus for hollow articles comprising a tubular heating coil adapted to surround an undersized cylindrical metal preform of the ultimate article, a means for supplying coolant fluid connected to said coil including means for its circulation therethrough, and expandable means adapted to be disposed within said preform and operative to stretch-form the preform to the ultimate article configuration, said coil, circulation means and expandable means being connected to a control circuit for their operation in a selected sequence whereby the preform is heated to its heat-treat temperature and then simultaneously formed and cooled at selected rates.

7. The apparatus of claim 6 wherein the wall of said heating coil adjacent said preform is provided with apertures, and said circulation means includes control means to eject the coolant through said apertures and onto said preform concurrently with the operation of the expandable means.

8. The apparatus of claim 6 including a vented container surrounding and enclosing said heating coil, and adjustable temperature control means within said container to constantly monitor and regulate the temperature therein, said temperature control means being connected to said control circuit to initiate the selected operating sequence aforesaid.

9. The apparatus of claim 6 wherein said coil comprises a stationary helix, and further including a rotatable mount for said preform, and a controllable drive for said mount whereby the preform is rotated at selected times during said selected sequence.

10. The apparatus of claim 6 wherein said control circuit includes a temperature sensitive control disposed adjacent said preform and a bank of adjustable time delay relays whereby initiation of said selected sequence is coordinated with the temperature of the preform.

11. The apparatus of claim 6 including a container having an exhaust outlet therefrom surrounding and enclosing said heating coil, and wherein said expandable means comprises a hollow segmented die having a substantially unbroken forming surface coextensive in length with the preform mounted within the preform, and a power actuated ram mounted on the bottom wall of the container and disposed within said die.

12. The apparatus of claim 11 including biasing means disposed between said container wall and each segment of said die and operative in opposition to the expansion of the die, said biasing means yielding upon operation of said expansion means.

13. The apparatus of claim 11 including a guide between each segment of said die and said bottom wall to control movement of the die in expanding as aforesaid.

14. The apparatus of claim 11 including arresting means disposed in the path of movement of said die in expanding to thereby establish the size of the ultimate article.

15. The apparatus of claim 14 wherein said arresting means comprises a control connected to said ram whereby contact of said die with said control terminates operation of the ram.

(References on following page)

References Cited by the Examiner

UNITED STATES PATENTS

| | | | |
|---|---|---|---|
| 1,444,258 | 2/23 | Lothrop | 266—6 |
| 1,444,259 | 2/23 | Lothrop | 266—6 |
| 1,994,629 | 3/35 | Arkema | 266—5 |
| 2,046,115 | 6/36 | Gottlieb | 266—5 |
| 2,146,793 | 2/39 | Buckner | 266—5 X |
| 2,277,601 | 3/42 | Morgan | 266—2 |
| 2,449,089 | 9/48 | Somes | 266—6 |
| 2,457,844 | 1/49 | Strickland | 266—4 |
| 2,458,587 | 1/49 | Gogan | 266—6 |
| 2,477,796 | 8/49 | Germany | 266—5 |
| 2,717,846 | 9/55 | Harvey | 148—12.4 |
| 2,726,973 | 12/55 | Corral | 148—11.5 |
| 2,762,734 | 9/56 | Corral | 266—6 X |
| 2,881,107 | 4/59 | Nachtman | 148—12 |

DAVID L. RECK, *Primary Examiner.*

RAY K. WINDHAM, MARCUS U. LYONS, *Examiners.*